(12) United States Patent
Wu

(10) Patent No.: US 7,251,414 B2
(45) Date of Patent: Jul. 31, 2007

(54) DATA STRUCTURE AND OPERATION METHOD FOR A/V DISKS

(75) Inventor: Kuo-Jui Wu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 320 days.

(21) Appl. No.: 09/984,310

(22) Filed: Oct. 29, 2001

(65) Prior Publication Data

US 2003/0021585 A1    Jan. 30, 2003

(30) Foreign Application Priority Data

Jul. 27, 2001    (TW) ................................ 90118423 A (51) Int. Cl.
*H04N 5/95* (2006.01)
*H04N 5/00* (2006.01)
*G06G 7/00* (2006.01)
*G11B 27/00* (2006.01)

(52) U.S. Cl. ............................ 386/70; 386/95; 386/96; 386/125; 707/101; 715/716

(58) Field of Classification Search ..................... 386/4, 386/52, 45, 55, 125–126, 98, 96, 95, 70; 707/205, 1, 2, 101, 102; 345/723; 715/716
See application file for complete search history.

(56) References Cited

U.S. PATENT DOCUMENTS

| | | | |
|---|---|---|---|
| 5,596,564 A * | 1/1997 | Fukushima et al. ........... 386/70 |
| 5,619,338 A * | 4/1997 | Nakai et al. ................... 386/70 |
| 5,963,208 A * | 10/1999 | Dolan et al. ................. 715/760 |
| 6,278,838 B1 * | 8/2001 | Mendenhall et al. ....... 386/125 |
| 6,292,625 B1 * | 9/2001 | Gotoh et al. ................... 386/95 |
| 6,370,537 B1 * | 4/2002 | Gilbert et al. ............... 707/101 |
| 6,577,811 B1 * | 6/2003 | Kikuchi et al. ................ 386/98 |
| 6,631,387 B2 * | 10/2003 | Kim et al. ................... 707/205 |
| 2001/0020211 A1 * | 9/2001 | Takayama et al. .......... 701/200 |

FOREIGN PATENT DOCUMENTS

CN    1245334 A    6/1999

* cited by examiner

*Primary Examiner*—James J. Groody
*Assistant Examiner*—Jamie J Vent
(74) *Attorney, Agent, or Firm*—Birch, Stewart, Kolasch & Birch, LLP (57) ABSTRACT

The invention relates to a data structure and operation method for A/V (audio/video) disks. The specification disclosures a type of navigation files with a new structure. This navigation file utilizes a plurality of tables with different data types to record data relevant to another A/V file in the disk. To distinguish different data types of tables, each table has a table head and a table serial number. There is also an erase/modify information table in each of the data types to record editing information that has been done (such as editing information of erase/modify). Any newly created or edited table is written to a disk by appending. When first using an A/V player to play A/V data, all the tables are combined into a navigation file through the steps of separating tables, modifying tables and rearranging table. Thus, newly created or edited A/V data in an A/V disk can be played without the need to modify the original navigation file in the disk.

13 Claims, 10 Drawing Sheets

DATA STRUCTURE AND OPERATION METHOD FOR A/V DISKS

BACKGROUND OF THE INVENTION

1. Field of the Invention

The present invention generally relates to a data structure and operation method for A/V disks and, more particularly, to a file structure for recording navigation data generated by editing or newly created A/V data and a method using the file structure to play the A/V data.

2. Related Art

The technique of using disks (such as CD's or floppy disks) to store A/V data is already well known. Two files have to be stored in the disk in order to successfully play the A/V data in an A/V player: one is an A/V data file for recording A/V contents, such as the "VRO file" in the DVD-video recording specification; the other is a navigation file upon which necessary navigation data for playing A/V data is recorded, such as the ".ifo file" in the DVD-video recording specification. This type of navigation files usually stores: (1) the playing time and related addresses in the A/V file for the A/V data; (2) original program information files; and (3) user defined play lists. The playing program in the A/V player plays the A/V data stored in the A/V data file according to the information recorded in the navigation file.

Figure 1:
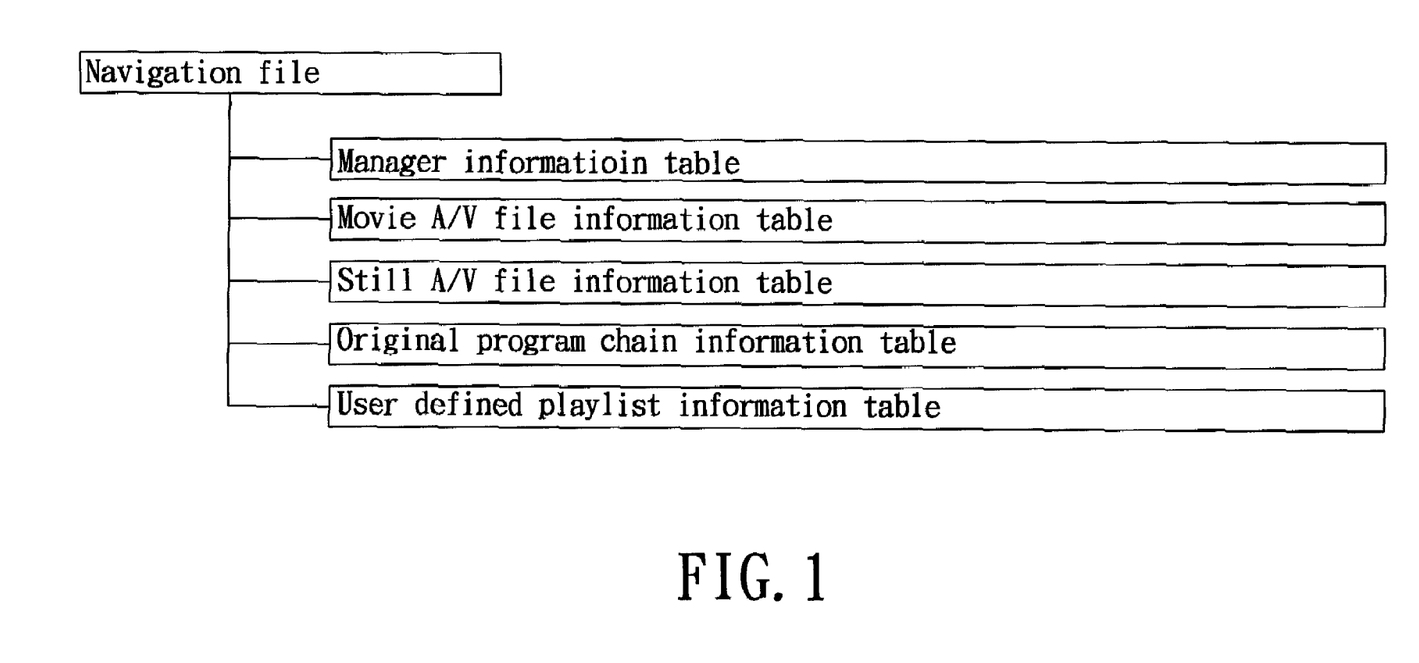
FIG. 1 shows the data structure of a conventional navigation file.

Please refer to FIG. 1 for the structure of a traditional navigation file. Various navigation data in the navigation file are first recorded using unique tables, and then a manager information table disposed in the beginning of the navigation file is used to record a start address for every table in the navigation file.

The structure of this type of traditional navigation file has some disadvantages:

1. When adding either still or movie A/V data (such as recording programs), a still or movie A/V information table has to be updated and so does the whole navigation file.
2. When users edit or change the play list, a play list information table has to be updated and so does the whole navigation file. If there is not enough space in the disk or a write-once optical disk is used, continuous updating will cause damage to the disk and shorten its life span, especially for write-once optical disk. This type of updating method that requires re-writing the navigation file each time will waste disk space. This is because each table in the navigation file uses an address-recording method (the data at the beginning address are recorded in the manager information table). So, whenever a table is updated, the beginning address needs to be reset and, therefore, the navigation file contents have be modified and updated again, abandoning the old navigation file.

SUMMARY OF THE INVENTION

A principal object of the invention is to provide a new navigation file structure. Whenever A/V data are edited or newly created, it is not necessary to modify the original navigation file in the disk and the edited or newly created navigation file will be added to the disk only using an append function. Even if a write-once disk is used, there is still no need to delete or re-write the original navigation file. Therefore, the invention can save disk space and prolong the life span of the disk.

The disclosed navigation file structure records data related to another A/V file in a disk. The related information is the so-called navigation data, which are saved in tables of different data types, including those storing navigation data of movie A/V data, those storing navigation data of still A/V data, and those storing navigation data of a play list. Since the table of each data type can be included via the edit or create operation by users, the navigation file of the invention can have more than two tables of the same data type. Each table has a table head followed by a table serial number for labeling the order of the table among the tables of the same data type. Each of the above-mentioned data types further has an erase/modify information table, which records edit/modify information done by users in the same data type (including deleting and modifying information).

The disclosed techniques also include a method of manipulating the navigation file, so as to control the A/V player under the guidance of the navigation file and to play A/V contents recorded in the A/V data. The method includes the steps of: downloading all tables in which navigation data are stored from the disk to the player and storing the tables to memory after separating each of the tables; modifying corresponding table contents according to the information recorded in each of the erase/modify information tables (such as the user defined play list); and making a new navigation file out of all the tables in which navigation data are stored. Thus, the invention achieves the above objects by guiding the A/V player to play the A/V data stored in a disk.

BRIEF DESCRIPTION OF THE DRAWINGS

The invention will become more fully understood from the detailed description given hereinbelow. However, the following description is for purposes of illustration only, and thus is not limitative of the invention, wherein.

DETAILED DESCRIPTION OF THE INVENTION

The disclosed data structure for A/V disks (see FIG. 2) includes two types of files: one is an A/V data file recording A/V contents and the other is a navigation file recording information related to the A/V data file. The A/V data file includes movie A/V data and still picture A/V data (pictures and captions). Through the information of the navigation file, A/V data in an A/V data file can be successfully played by an A/V player.

The invention has, in particular, a "language-style" navigation data structure to construct each data table for recording navigation data in a navigation file. The disclosed navigation file distinguishes tables of several different data types (or attributes) and more than two tables can exist in any data type at the same time. That is, more than two tables of the same data type (or attribute) can exist in the whole navigation file. However, each table has a table head and a table serial number for distinction.

Figure 2:
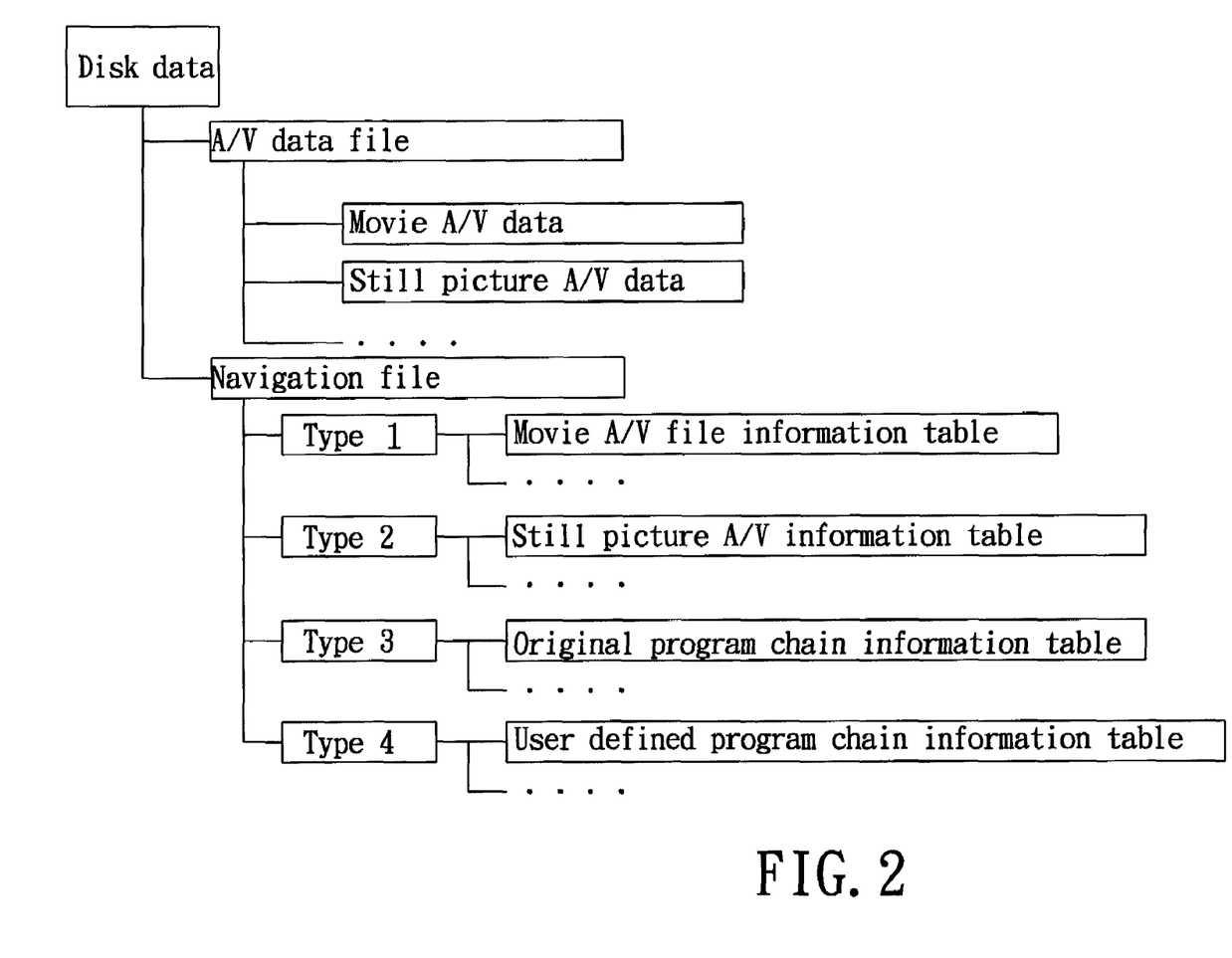
FIG. 2 shows the data structure of a navigation file in accordance with the invention.
Figure 3:
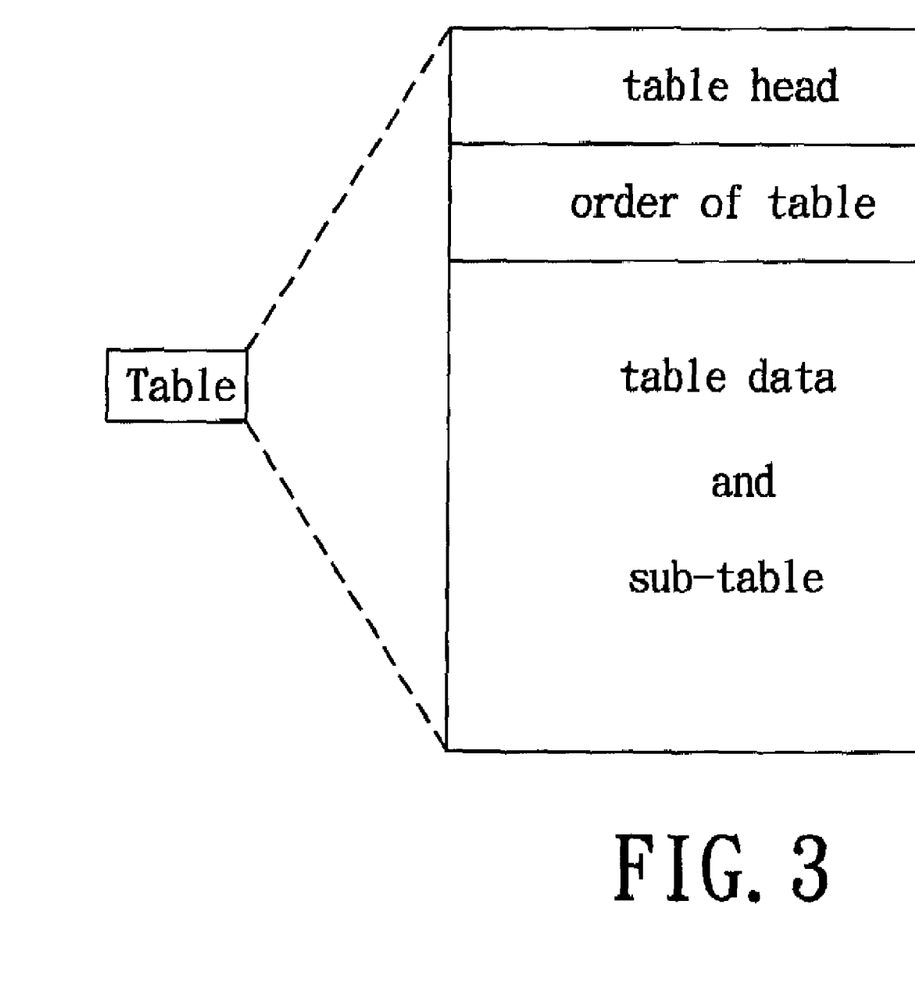
FIG. 3 shows the data structure of a navigation data table stored in the disclosed navigation file.

FIGS. 2 and 3 show a structure of the disclosed navigation file:

The disclosed navigation file contains tables of several different data types (tables of several different attributes) to save navigation files of different data types, including:

1. a movie A/V information table;
2. a still picture A/V information table;
3. an original program chain information table; and
4. a user defined program chain information table.

There is an edit/addition information table (the edit function includes the operations of erasing and modifying data) in each of the data types to record any edited information (erased and modified information) in the same data type done by users.

The purpose of the original program chain information table is to record the program information for A/V data (including movie A/V data and still picture A/V data). Since the movie A/V information table, the still picture A/V information table and the original program chain information table belong to different data types, each of the movie A/V information table or still picture A/V information tables involve an associated original program chain information table.

The data structure of each table is shown in FIG. 3. At the beginning of each table, a data length of several bytes (FIG. 2 shows an example with four bytes) is defined as the table head. A head index is stored in the table head for labeling a data starting address of each table.

After the table head, a data length of several bytes is used to record its table serial number among tables of the same attribute. This serial number allows the table to be identified accurately. What follows are the true table data or data of sub-tables.

A method of how to add navigation data due to edited information (such as play lists) or newly created A/V data into disks is explained with reference to FIG. 4. Take, for example, a disk storing navigation data: a movie A/V information table, a still picture A/V information table, an original program chain information table, and a user defined program chain information table.

Several different data operations are then made to the contents, including:

1. Creating a new movie program. Under this operation, two tables recording related navigation data are created. They are a movie A/V information table and an original program chain information table.
2. Creating a new still picture program. Under this operation, two tables recording related navigation data are created. They are a still picture A/V information table and an original program chain information table.
3. Creating a new play list. A user defined program chain information table is created in this operation; and
4. Modifying a play list. An erase/modify information table is created in this operation to record information about the modified play list.

The above-mentioned newly created tables (see FIG. 5) are written to the disk by appending once they are established. In addition to the navigation data shown in FIG. 4, the new tables in FIG. 5 are also created in the disk. Of course, the serial numbers of the newly created tables must be different from those of the tables of same data type in the disk. Thus, whether a floppy disk, a CD-RW, or a write-once CD-R is used, using the disclosed method does not modify anything in the tables already stored in the discs. That is, in accordance with the disclosed method, the tables can still be used without any modification. A new serial number of the table is attributed to each table newly added to the disk so the table can be distinguished from other tables with the same attribute. This is different from the conventional method that has to modify the navigation files and discard the original files.

Figure 6:
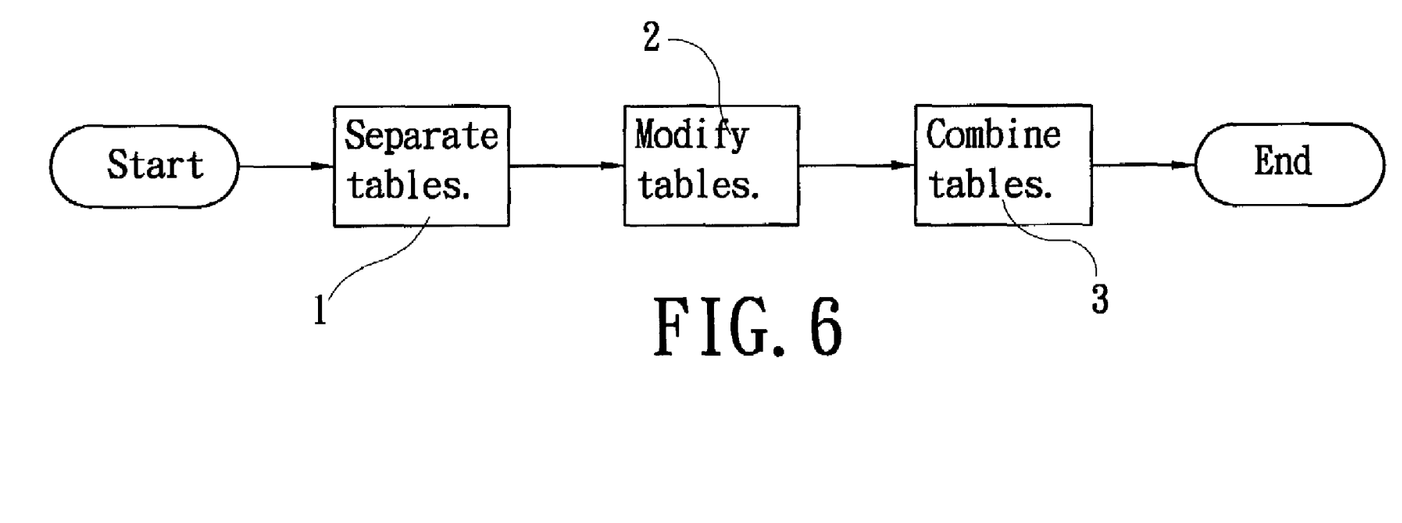
FIG. 6 is a flowchart of the operation steps in accordance with the invention.

All of the tables written onto the disk (including the originally stored and newly added tables) are not combined into a navigation file for playing A/V data through the following steps (FIG. 6) until an A/V player is initiated by a user to play the A/V contents. Referring to FIG. 6, the steps include:

Step 1: The table separating step. This step downloads all the tables stored with navigation data from the disk to the player. Each table is then separately stored in the memory;

Step 2: The table modifying step. This step modifies table contents according to the editing information in each of the erase/modify information tables; and Step 3: The table combining step. In addition to the erase/modify information table, this step combines all the tables recording the navigation data (including tables to be modified and those already modified) into a new navigation file.

The program for handing three steps mentioned above are recorded in memory 30 (such as flash ROM) by means of programming. Through a microprocessor 20 installed in an A/V player (such as a CD player or a PC), the three steps are executed in the beginning of playing the A/V contents to construct a navigation file for playing the A/V data.

Figure 7:
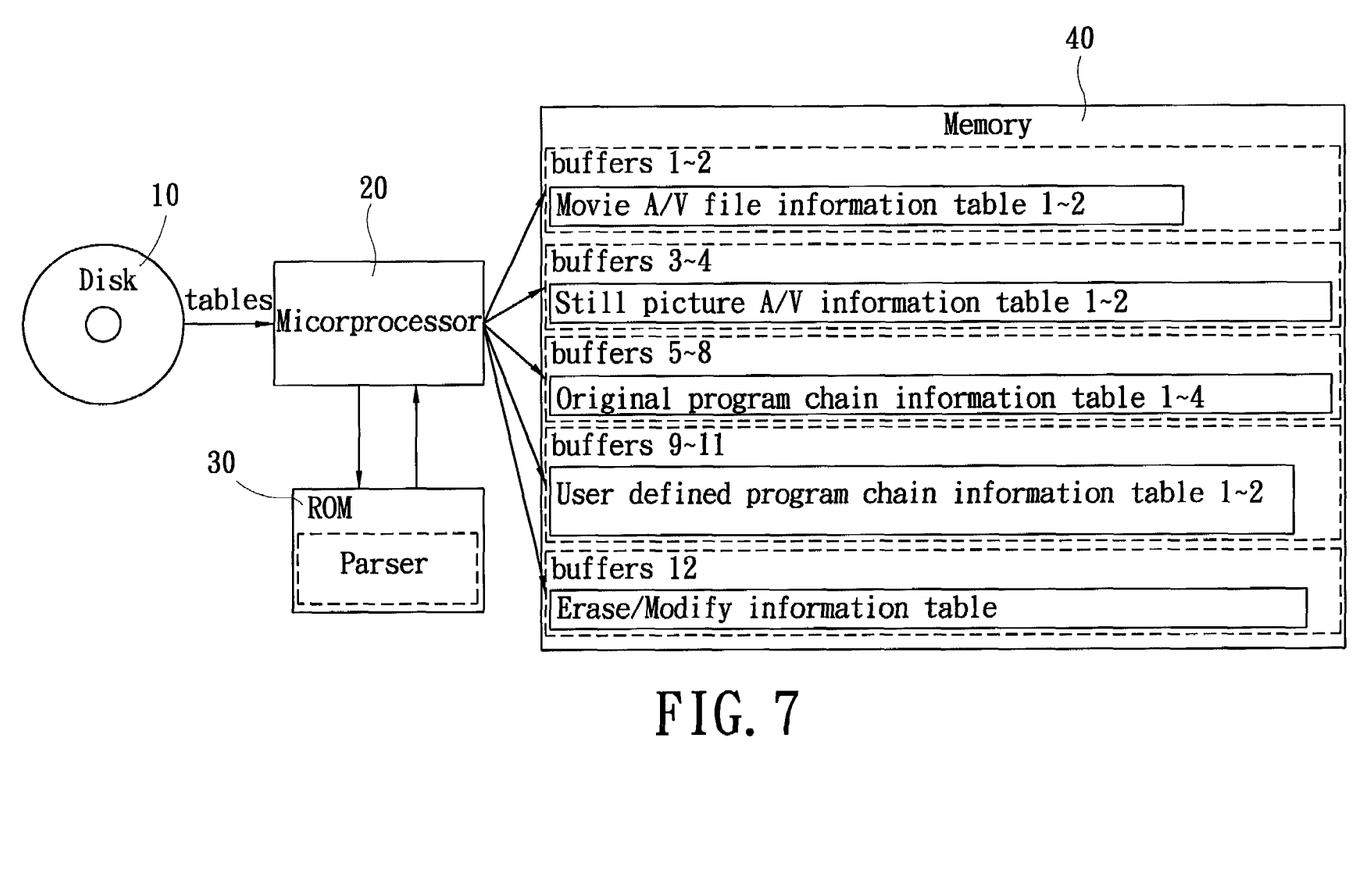
FIG. 7 is a detailed processing flowchart of the first step.

The details of step 1 are shown in FIG. 7. First, each of the tables recorded with the navigation files in the disk 10 is loaded to the memory. Secondly, each of the tables is identified by a parser program in the flash ROM 30 built in the microprocessor 20 according to the table head and serial number of the table. Finally, the navigation data recorded in each of the tables are saved to different buffers of the memory 40.

Figure 8:
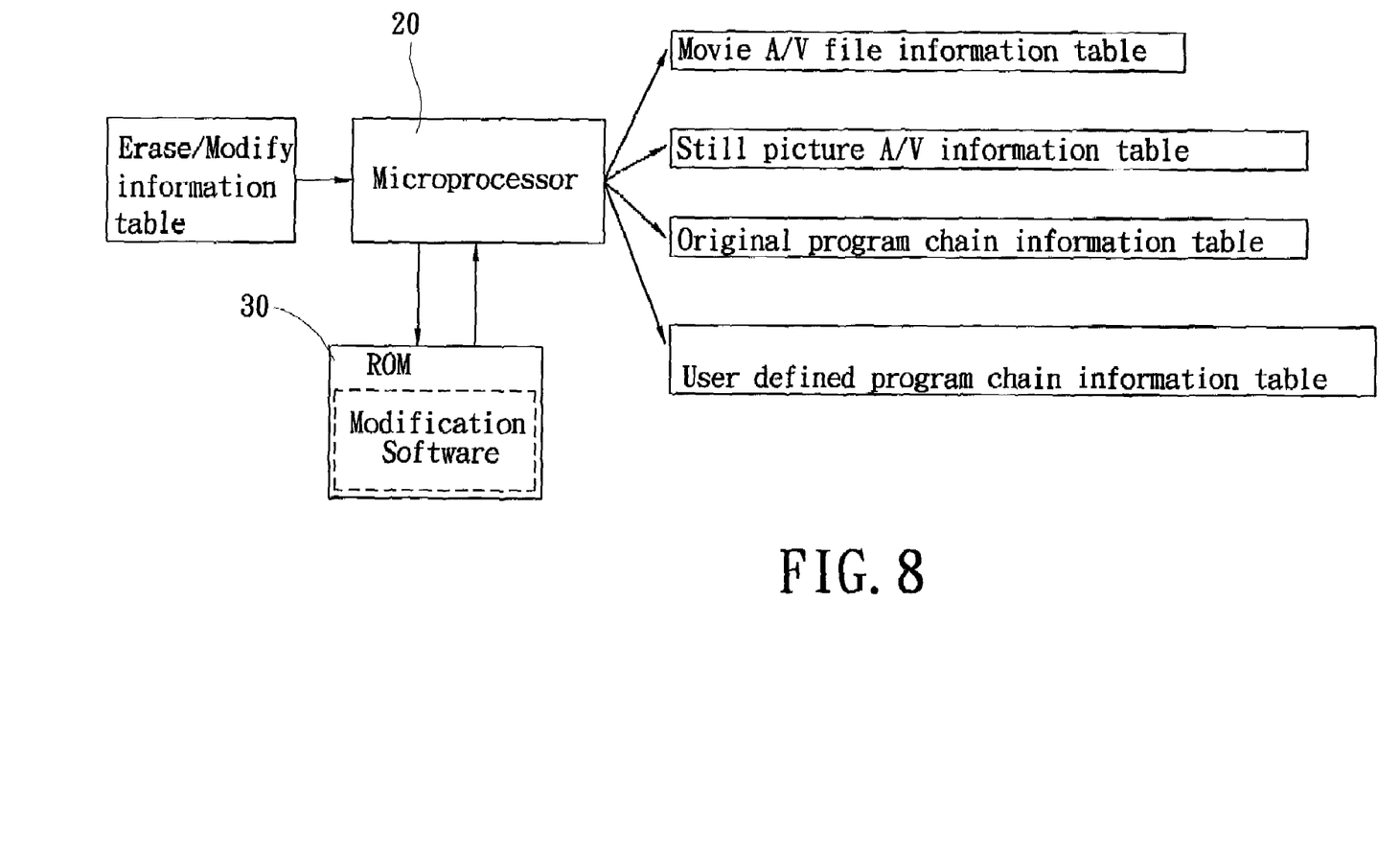
FIG. 8 is a detailed processing flowchart of the second step.

FIG. 8 shows the detailed procedure of step 2. In step 2, the microprocessor 20 runs modification software to modify the data in the tables according to the editing information recorded in the erase/modify information table. For example, after a user changes the content of the play list, the modified information is immediately recorded in the erase/modify information table. The table contents relevant to the play list are then modified by the modification software according to the modification information recorded in the erase/modify information table.

Figure 9:
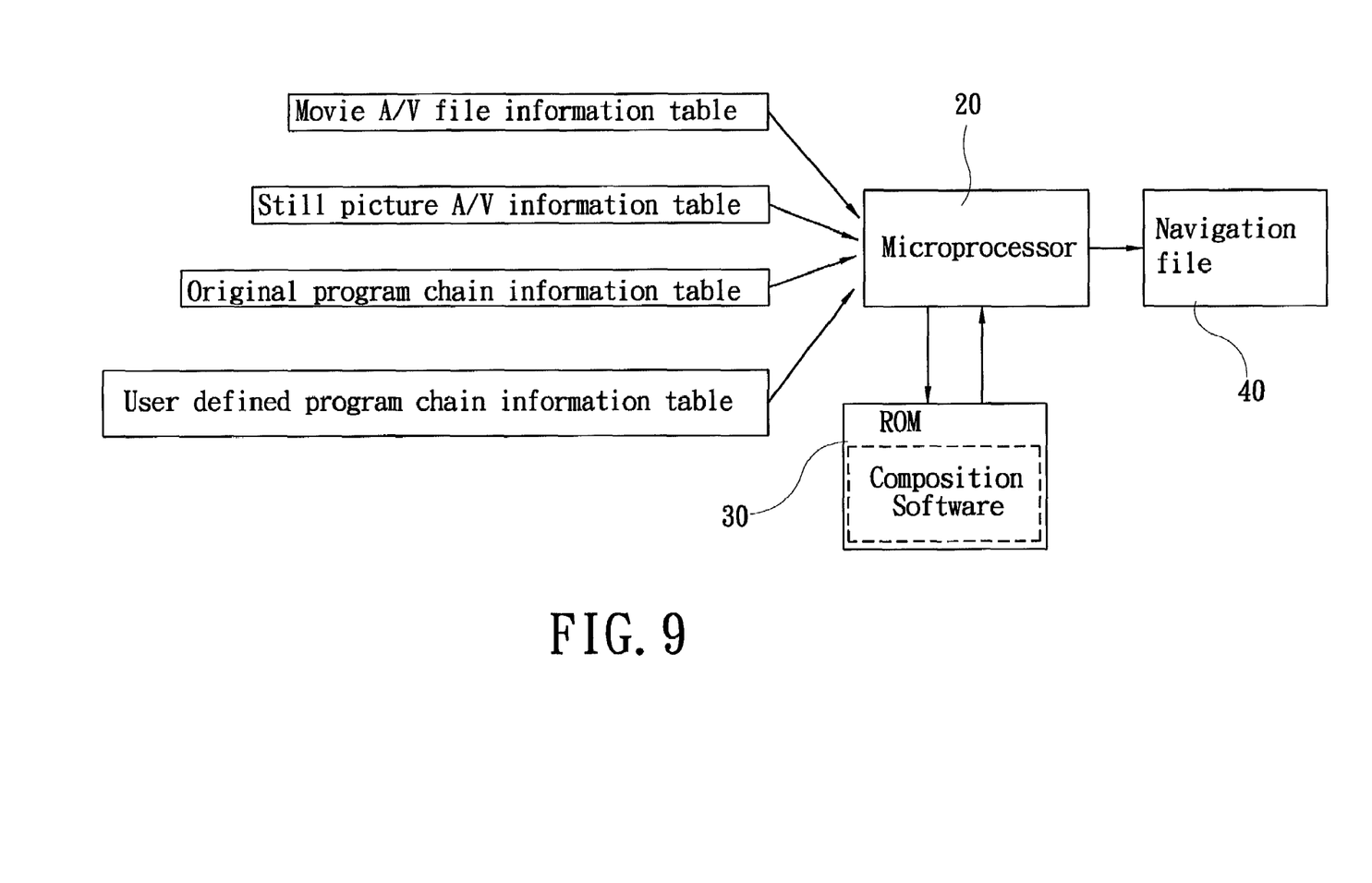
FIG. 9 is a detailed processing flowchart of the third step.
Figure 10:
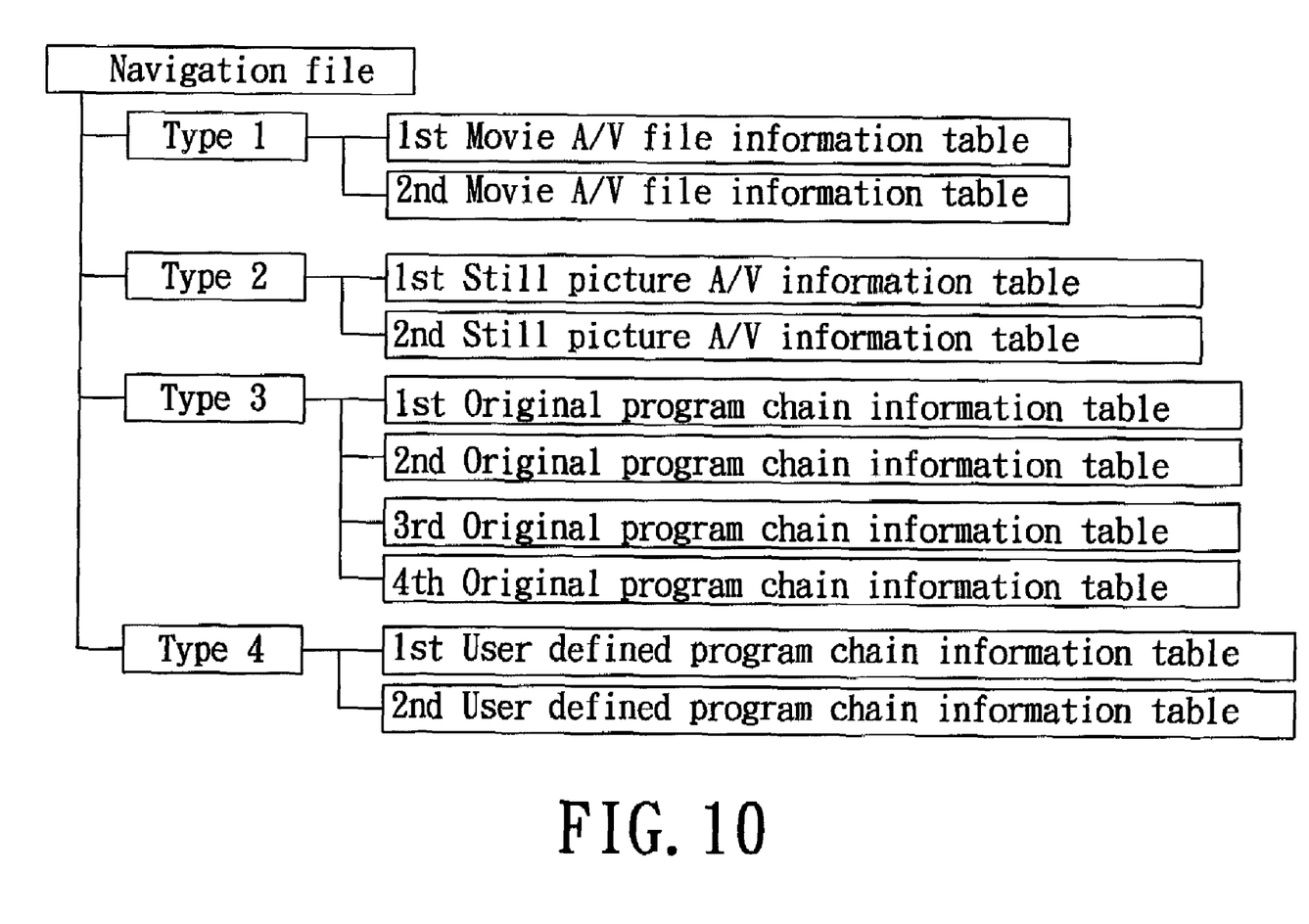
FIG. 10 shows the structure of a navigation file, showing the contents of a navigation file generated by the disclosed method.

After finishing step 2, all of the tables (except the erase/modify information table) are re-combined into a new navigation file through step 3, as shown in FIG. 9. In step 3, composition software run by the microprocessor 20 creates a new navigation file (as shown in FIG. 10) from each of the tables (including the new tables generated from the modified or newly created A/V data and the tables already stored in the disk) according to the table head and the serial number of the table. The new navigation file is stored in the memory 40 of the A/V player to guide the A/V player to read the A/V data (including the original and subsequently edited/newly created A/V data) stored in the disk 10. That is, the new navigation file is constructed by the above-mentioned steps only when the A/V player is first used, and it is saved in the memory 40 of the A/V player.

Figure 4:
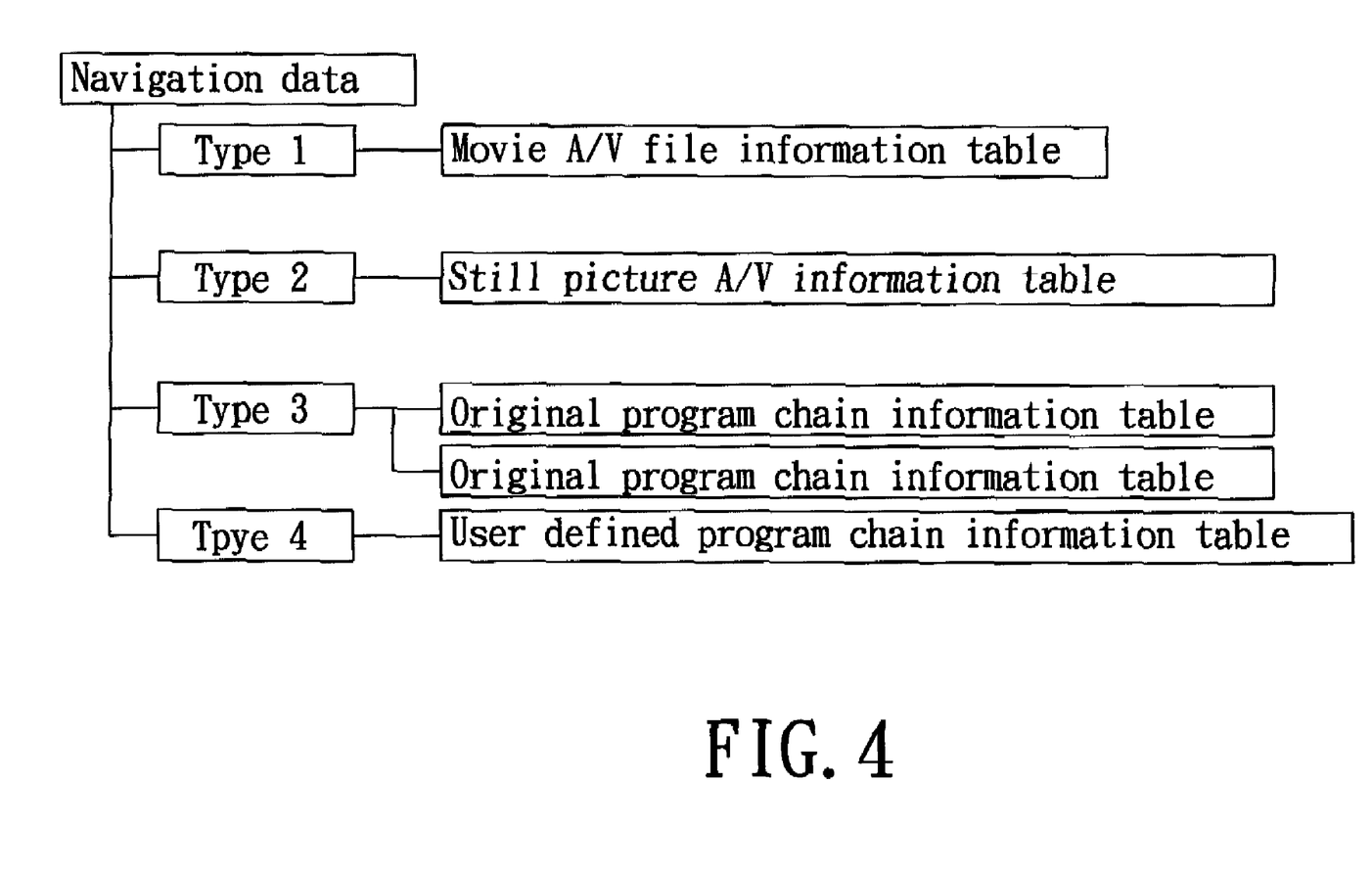
FIG. 4 shows the contents of an original navigation file according to an embodiment of the invention.
Figure 5:
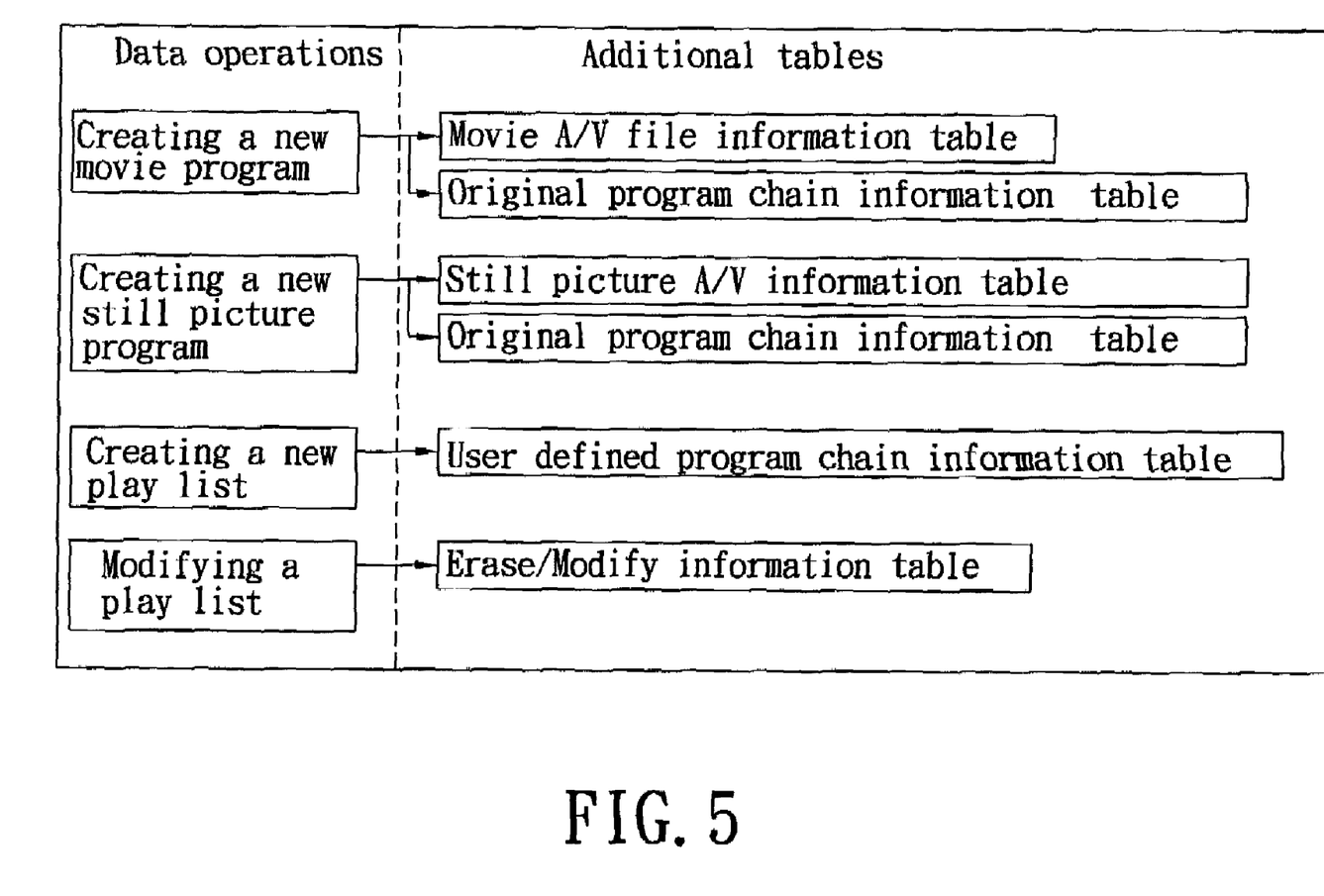
FIG. 5 shows the contents of a new table generated from modified or newly created A/V data in accordance with an embodiment of the invention.

FIG. 10 shows the difference between the disclosed navigation file table and the original table in the disk (as shown in FIG. 4). The main difference is that the serial numbers of the tables with the same attributes are not the same. For convenience in explanation, we assign a serial number to each table directly in front of the name of the table for tables of the same attribute (e.g. 1st, 2nd, 3rd, and $4^{th}$) in FIG. 10. Any new table generated from the edited or newly created A/V data is also assigned a serial number following the rule mentioned above to label the order of the table among the tables of the same attribute.

When a disk is put into an A/V player in which the function of the disclosed new navigation file is implemented, the player builds a navigation file in its memory through the third step. The player then reads the A/V data occupying the large part of the disk and plays the data. Since the size of the navigation file is not big (typically 10's of Kbytes or 100's of Kbytes), it takes a very short time to download the navigation file (completed within one second). All the tables in the navigation file may be written to a disk at different times. The reason for this is that the new table generated from edited or newly created A/V data is appended to the disk in the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data structure of an A/V disk, comprising:
   an A/V data file for recording movie A/V data and still picture A/V data;
   a navigation file including a plurality of tables, each of the plurality of tables corresponding to one of a plurality of data types, for recording A/V data navigation data related to the A/V data, the data types of the plurality of tables including a movie A/V information table, a still picture A/V information table, an original program chain information table, and a user defined program chain information table; and
   a plurality of additional tables, the plurality of additional tables including:
      an erase/modify information table of recording editing information in the data types, and
      at least one of an additional movie A/V information table, an additional still picture A/V information table, and an additional original program chain information table;
   wherein each of the plurality of tables and of the plurality of additional tables has a table head and a serial number followed by the table head for labeling an order of the tables and the additional tables, and the plurality of additional tables are written into the A/V disk without overwriting the plurality of tables.

2. The data structure of claim 1, wherein the table head contains a data length of a plurality of bytes for recording a head index to table the starting address of the table.

3. The data structure of claim 1, wherein the serial number of the table contains a data length of a plurality of bytes for recording the serial number of the table among tables of the same attribute for the table to be correctly identified.

4. The data structure of claim 1, wherein the plurality of additional tables includes at least a table generated from newly created A/V data.

5. The data structure of claim 1, wherein the additional user defined program chain information table records information of a newly created play list.

6. The data structure of claim 1, wherein the erase/modify information table records editing information of a play list.

7. The data structure of claim 6, wherein the erase/modify information contains information of deleting and modifying the play list.

8. A method of manipulating a data structure of an A/V disk in an A/V player for making a new navigation file from a plurality of additional tables and an original navigation file having a plurality of tables recorded with navigation data in the A/V disk, which comprises:
   performing a table separating step to separate the plurality of tables and the plurality of additional tables in the disk and to save the tables to memory of the player;
   performing a table modifying step in a playing mode of the A/V player to modify the table contents in the memory according to editing information recorded in an erase/modify information table of the plurality of additional tables; and
   performing a table combining step to combine all of the plurality of tables and additional tables in the memory into the new navigation file, wherein each of the plurality of tables and of the plurality of additional tables has a table head and a serial number followed by the table head for labeling an order of the tables and the additional tables, and the plurality of additional tables are written into the A/V disk without overwriting the plurality of tables.

9. The method of claim 8, wherein at least one of the plurality of tables and one of the plurality of additional tables are of the same data type.

10. The method of claim 8, wherein the table head contains a data length of a plurality of bytes for recording a head index that labels a starting address of the table.

11. The method of claim 8, wherein the serial number of the table contains a data length of a plurality of bytes for recording the serial number of the table among the tables of the same data type for the table to be correctly identified.

12. The data structure of claim 1, wherein the A/V disk is a write-once-only recording medium.

13. The data structure of claim 1, wherein the A/V disk is a rewritable recording medium.

* * * * *